United States Patent Office

3,210,296
Patented Oct. 5, 1965

3,210,296
SUPPORTED NOBLE METAL CATALYST
Thomas J. Gray, Alfred, N.Y., assignor to Phillips Petroleum Company, a corporation of Delaware
No Drawing. Filed May 24, 1963, Ser. No. 282,876
1 Claim. (Cl. 252—466)

This invention relates to a supported noble metal catalyst. In one aspect the invention relates to a method for the preparation of a supported noble metal catalyst having increased surface area. In another aspect the invention relates to a hydrocarbon conversion process with a novel, supported noble metal catalyst.

Numerous metals and metal oxides have been suggested and used as catalysts for such processes as hydrogenation, dehydrogenation, cyclization and similar hydrocarbon conversion processes. Particularly suited are noble metal catalysts supported on a porous support, for example, platinum supported on alumina. Various methods for the preparation of these catalysts have been proposed.

In general, the supported noble metal catalyst is composited with a suitable support such as alumina which is first prepared by methods well known in the art, such as by precipitation of the alumina, washing, drying and calcining. Alumina may be formed into particles of uniform or irregular size or shape prior to combining with the platinum. The prepared support is then impregnated with an aqueous solution of a noble metal compound, such as chloroplatinic acid. The resultant composite is dried and then calcined to reduce the platinum to the metallic state and to activate the composite for hydrocarbon conversion reactions.

It has been found that aqueous impregnation and subsequent thermal treatment results in a significant reduction in surface area and modification in pore size and pore size distribution. Such changes are undesirable.

It has now been discovered that a novel, supported noble metal catalyst may be prepared by impregnation with the noble metal in a non-aqueous medium to provide a catalyst having increased surface area over a catalyst similarly prepared by aqueous impregnation.

It is an object of the invention to prepare a novel, supported, noble metal catalyst.

Yet another object of the invention is to provide a novel method for the preparation of a supported, noble metal catalyst.

Yet another object of the invention is to provide a method for the conversion of hydrocarbons.

Yet another object of the invention is to provide a method for increasing the surface area of a supported, noble metal catalyst as compared to the surface area obtained when aqueous medium is employed for impregnation.

These and other objects of the invention will be readily apparent to those skilled in the art from the accompanying disclosure and appended claims.

These objects are broadly accomplished by impregnating a support selected from the group consisting of alumina, titania, zirconia, magnesia, thoria, chromia and combinations thereof, with at least one noble metal compound dissolved in a medium selected from the group consisting of alcohols, ethers, aldehydes, ketones and mixtures thereof having 1 to 5 carbon atoms per molecule, inclusive, drying the thus-prepared composite to remove the solvent and calcining said composite to reduce the noble metal to its metallic state.

In another aspect of the invention, the thus-prepared supported, noble metal catalyst is employed for hydrocarbon conversions.

It has been found that when a dried alumina or similar gel is impregnated with a noble metal compound in an aqueous medium, such as an aqueous chloroplatinic acid solution, and again redried, it apparently goes through a hydrothermal recrystallization which, among other effects, closes up some pores and causes the particulate gel to cake to some degree. Surface area is thereby drastically reduced. For example, it has been found that in an eta-alumina which has been impregnated with an aqueous solution of chloroplatinic acid, dried and calcined, that the surface area is reduced from about 220 meters$^2$/gram to 60 to 80 meters$^2$/gram.

It has now been surprisingly discovered that by simply impregnating the support with a solution of the noble metal in an alcohol, ketone, aldehyde, ether or combination thereof having from 1 to 5 carbon atoms per molecule, inclusive, that the reduction in surface area from the initial surface area of the support is much less than with a similar aqueous impregnation. For example, it has been found that for an alcoholic, chloroplatinic acid solution, impregnation of alumina in a manner similar to that above-described for an aqueous impregnation with subsequent drying and calcining, that the surface area is reduced only from 220 meters$^2$/gram to about 180 to 200 meters$^2$/gram. This compares to a reduction from 220 meters$^2$/gram to 60–80 meters$^2$/gram for the aqueous impregnation.

By providing a catalyst having high surface area, it is possible to reduce the quantity of catalyst required for a particular hydrocarbon conversion process or to even produce an increased amount of product per pound of catalyst although the conversion at equilibrium per unit surface area is not necessarily changed.

The process of the invention is applicable to the preparation of catalyst from any one or more of the noble metals of the platinum family. The noble metals applicable to this invention include platinum, palladium, osmium, iridium, rhodium and ruthenium. Platinum is by far the most widely used metal of this group in catalytic processes and next in order comes palladium. The ensuing discussion of the process is directed primarily to the preparation of a platinum-containing catalyst but it is understood that the method is also applicable to the other noble metals. In addition, the non-aqueous impregnation technique of this invention is also applicable to the deposition of more than one noble metal on a support, simultaneously. The result is a supported alloy catalyst which comprises a mixture of noble metals, such as, for example, a supported platinum-ruthenium or a supported platinum-rhodium catalyst. The noble metal compounds are generally halides, sulfates, oxides and organo-metal compounds of the above-identified noble catalysts which are soluble in alcohols, ketones, aldehydes or ethers. Particularly suitable examples of noble metal compounds which are soluble in one or more of the above non-aqueous solvents are platinum tetrabromide, platinum tetrachloride, platinum sulfate, palladium dichloride, palladium dioxide, osmium tetraoxide, osmium ammonium chloride, osmium dichloride, iridium tetrabromide, iridium tetrachloride, and ruthenium tetrachloride, and the like.

Any of the noble metal compounds are employable which are soluble in at least one of the hereinafter-described solvents and which will be converted to the metallic state upon calcining. In addition, the compound should be one that will decompose upon calcining and leave the support by evaporation or similar means so as to remove all but the metallic metal from the support.

The amount of noble metal preferably incorporated into the support after calcining will vary according to the process utilizing the catalyt but generally is in the range of about 0.5 to about 1 weight percent or even higher. Although a fine dispersion of other insoluble noble metal compounds may also be present, the results obtained are generally not the equal of that obtained from solution type impregnation although the results are an improvement over a similar aqueous impregnation.

The solvents employed for the noble metal compound and used in the impregnation of the support must be a solvent for the noble metal compound, must not chemically combine with the support and must be removable at a relatively low temperature. It has been found that particularly suitable compounds include the alcohols, ethers, ketones, and aldehydes having from 1 to 5 carbon atoms, inclusive, per molecule. Particularly preferred are the alcohols, such as methanol and ethanol. Suitable examples include but are not limited to methanol, ethanol, isopropanol, diethyl ether, methyl ethyl ether, ethyl propyl ether, acetone, methyl ethyl ketone, acetaldehyde, propionaldehyde, and the like.

The concentration of the noble metal compound in the solvent is variable over a wide range and depends upon its solubility, the final results desired from the catalyst and the ultimate process in which it is employed but generally is in the range of 1 to 50 weight percent of the noble metal compound per total weight of solute.

The support is generally prepared by precipitation, washing, drying and calcining or other methods known in the art. The preferred supports, or carrier material for the noble metal is alumina but other suitable supports include titania, zirconia, magnesia, thoria, chromia, or combinations of these, such as chromia-alumina and silica-alumina.

By the method of this invention, the support is impregnated with a non-aqueous solution of a noble metal compound instead of an aqueous solution of a noble metal compound. The composite is then dried at a temperature sufficient to evaporate the solvent but not detrimental to the composite. For example, with ethanol the excess impregnating liquid may be first drained off and then the alumina dried at a temperature of about 100 to 400° C. to remove the ethanol. The thus-dried alumina-noble metal compound composite is then treated with hydrogen at an elevated temperature, for example, 200 to 500° C., to reduce the noble metal to the metallic state.

By the method of this invention, the reduction in surface area of the alumina or other support by the impregnation, drying and calcining steps, is much less than for a similar aqueous impregnation. It has been found that the surface area of the supported noble metal catalyst is at least 50 percent of the original support before impregnation. Preferably, the surface area of the catalyst composite is at least 75 percent of the original support. This retention of active surface area is most surprising since lamellar alumina having a particle size of about 0.1 micron which is impregnated with an aqueous system increases in particle size to about 15 to 20 microns due to caking thereby reducing effective surface area. Alcoholic impregnation of this same alumina showed no caking and no increase in particle size.

The noble metal catalysts prepared by the method of this invention are suitable for use in a wide variety of chemical and petroleum processes including hydrogenation, sulfonation, alkylation, hydrocracking, oxidation, cyclization, dehydrogenation, isomerization, and the like. The supported noble metal catalysts prepared by the method of this invention are particularly suitable for the isomerization of paraffins having from 4 to 7 carbon atoms per molecule. Particularly preferred is the isomerization of pentane to isopentane.

As used herein, surface area refers to the surface area of the catalyst composite as determined by the method described in Analytical Chemistry, 30, 1387–90 (1958) in an article by F. M. Nelsen and F. T. Eggertsen entitled "The Determination of Surface Area: Adsorption Measurements by Continuous Flow Method."

The invention is best described by reference to the following example:

Example I

A 10 weight percent solution of chloroplatinic acid in ethanol was used to impregnate a quantity of dry eta-alumina. The alumina was a conventional catalyst grade, particulate material having a surface area of about 220 $m.^2/gm$. The excess impregnating liquid was drained off and the alumina was dried at about 300 to 350° C. and then treated with hydrogen at 300° C. to reduce the platinum to the metallic state. The finished catayst composite contained about 0.6 weight percent platinum. The catalyst composite was employed in the hydroisomerization of pentane to isopentane using a hydrogen feed at 250° C. The yield was 100 percent of that theoretically possible at equilibrium.

A number of similar impregnations were carried out in similar fashion using methanol instead of ethanol. The quantity and concentration of the impregnating solution was adjusted to provide finished catalysts having platinum contents of from 0.1 to 1 weight percent. All the catalysts had surface areas which fall in the range of 180 to 200 $m.^2/gm$. This was in sharp contrast to similar catalysts prepared in an essentially identical manner except that water was used as the solvent for the platinum compound. These water impregnated catalysts had surface areas which fell in the range of 60 to 80 $m.^2/cm$.

Example II

By the method of Example I, a 5 weight percent solution of palladium dichloride in acetone is used to impregnate a dry particulate, gamma-alumina having a particle size of about 100 mesh (U.S. Series) and a surface area of about 210 $m.^2/gm$. The excess liquid is drained off and the composite is dried at 300° C. in an oven and then treated with hydrogen at 300° C. for four hours to reduce the palladium salt to the metallic state. The finished catalyst, containing 0.1 weight percent palladium, has a surface area of about 185 $m.^2/gm$. and has excellent isomerization activity.

Example III

A 1 gm. quantity of platinum tetrachloride is dissolved in 50 gm. of diethyl ether and contacted with 20 gm. of dried eta-alumina and heated on a hot plate with stirring to remove the solvent. The alumina powder is then dried and hydrogen treated at 325° C. as described in Example I. The finished catalyst has a surface area of about 190 $m.^2/gm$. (the original alumina has a surface area of about 220 $m.^2/gm$.) The catalyst has excellent activity for hydrogenation of olefins.

Example IV

By the method of Example I, an isopropanol solution of ruthenium tetrachloride is contacted with dried particulate, alumina-chromia base (containing about 5 weight percent chromia) to produce, after drying and hydrogen treating at 300° C., a composite containing 0.1 weight percent elemental ruthenium. The catalyst has a high surface area of about 180 $m.^2/gm$. and is an active catalyst for a number of catalytic conversions.

While certain examples, structures, composition and process steps have been described for purpose of illustration, the invention is not limited to these. Variation and modification within the scope of the disclosure and the claim can readily be effected by those skilled in the art.

I claim:

A method for preparing a platinum-alumina catalyst comprising impregnating alumina with a 1 to 50 weight percent diethyl ether solution of platinum tetrachloride, removing the excess liquid, drying the thus-prepared composite at a temperature of 100 to 400° C. to evaporate the diethyl ether, and calcining the thus-dried composite in the presence of hydrogen at a temperature of 200 to 400° C. to reduce the platinum to the metallic state, said composite having a platinum content of about 0.05 to about 1.0 weight percent based on total composite weight and a surface area greater than a composite impregnated with aqueous platinum tetrachloride and similarly dried and calcined.

References Cited by the Examiner

UNITED STATES PATENTS

| | | | |
|---|---|---|---|
| 2,841,626 | 7/58 | Holzman et al. | 260—683.68 |
| 2,905,736 | 9/59 | Belden | 260—683.68 |
| 3,606,176 | 11/62 | Schwarzenbek | 260—863.68 |

OTHER REFERENCES

Handbook of Chemistry and Physics, 27th ed., Chemical Rubber Co., Cleveland, Ohio, 1943, page 428.

ALPHONSO D. SULLIVAN, *Primary Examiner.*